United States Patent

Stewart

[15] 3,663,885
[45] May 16, 1972

[54] FAMILY OF FREQUENCY TO AMPLITUDE CONVERTERS

[72] Inventor: Carrington H. Stewart, Houston, Tex.
[73] Assignee: The United States of America as represented by the Administrator of the National Aeronautics and Space Administration
[22] Filed: Apr. 16, 1971
[21] Appl. No.: 134,573

[52] U.S. Cl. .......................... 328/140, 307/233, 324/78 D, 324/186, 328/136
[51] Int. Cl. ..................................................... H03k 5/20
[58] Field of Search .................... 328/127, 129, 136, 140; 307/233, 295; 324/78 D, 186

[56] References Cited

UNITED STATES PATENTS

| | | |
|---|---|---|
| 3,413,449 | 11/1968 | Brown ................................ 328/140 X |
| 3,432,687 | 3/1969 | Emmer ................................ 324/186 X |
| 3,524,131 | 8/1970 | McWaid ............................. 324/186 X |
| 3,579,126 | 5/1971 | Paul ....................................... 328/129 |
| 2,831,162 | 4/1958 | Gross ............................... 324/78 D X |
| 3,430,149 | 2/1969 | Williams ........................... 307/233 X |
| 3,512,013 | 5/1970 | Calfee ................................... 307/233 |
| 3,526,841 | 9/1970 | Holmboe et al .................. 307/233 X |

Primary Examiner—Stanley T. Krawczewicz
Attorney—Marvin J. Marnock, Marvin F. Matthews and John R. Manning

[57] ABSTRACT

A family of frequency to amplitude converters is disclosed which convert an incoming signal of a complex waveform and unknown frequency into an output signal corresponding in amplitude to the unknown frequency of the input signal thereby permitting accurate determination of the frequency of the complex input signal waveform.

10 Claims, 4 Drawing Figures

Carrington H. Stewart
INVENTOR.

BY M. J. Marnock
ATTORNEY

FAMILY OF FREQUENCY TO AMPLITUDE CONVERTERS

ORIGIN OF THE INVENTION

The invention described herein was made by an employee of the United States Government and may be manufactured and used by and for the Government of the United States of America for governmental purposes without the payment of any royalties thereon or therefor.

BACKGROUND OF THE INVENTION

1. Field of the Invention

The present invention relates to a family of frequency to amplitude converters for time series analysis of signals.

2. Description of the Prior Art

The prior art frequency to amplitude converters, such as for example the driving circuitry of a frequency meter, included a limiter-differentiator-clipper arrangement for providing uniform narrow pulses of a frequency proportional to the input signal frequency. The narrow pulses drove a monostable multivibrator producing constant-width output pulses of a frequency proportional to the input signal frequency which were then low-pass filtered to obtain a signal whose voltage was proportional to the average frequency of the output pulses.

Such prior art converters were often inaccurate and imprecise and thus undesirable for use when prompt and accurate analysis and determination of the frequency of an input signal was desired.

SUMMARY OF THE INVENTION

Briefly, the present invention provides a family of frequency to amplitude converters for conversion of the frequency of an input signal into the amplitude of an output signal for analysis and like purposes, in which signals representing threshold or axis crossings of the input signal are conveyed to a control circuit to allow a counting means to count a series of clock pulses provided by a clock. The output count of the counting means is converted into a signal corresponding in amplitude to the output count, whereby the output signal amplitude indicates the duration between axis crossings from which the frequency of the input signal may be determined. Upper and lower limit circuitry control the counting operation of the counting means to provide upper and lower frequency limits, respectively, for converting the input signal frequency into an output amplitude. One embodiment of the family of converters of the present invention converts the input frequencies into a plurality of output signals varying in amplitude in accordance with the upper frequency and lower frequency components of the input frequency for analysis and like purposes.

DESCRIPTION OF THE PREFERRED EMBODIMENT

Figure 1:
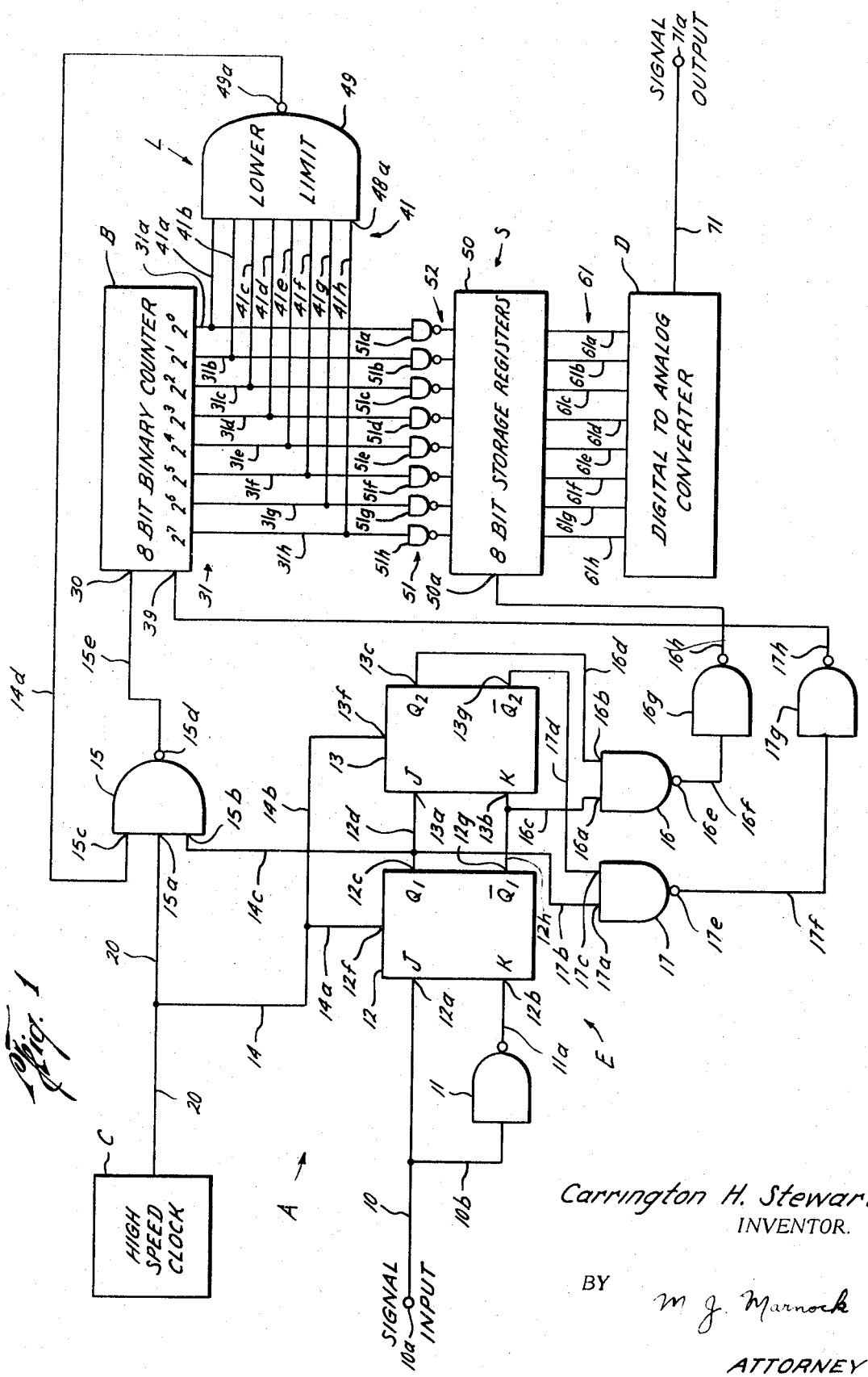
FIG. 1 is a schematic electrical circuit diagram of a frequency to amplitude converter of the family of frequency to amplitude converters of the present invention.

In the drawings, the letter A designates generally the apparatus of the present invention which converts an incoming complex signal waveform of an unknown frequency into an output signal corresponding in amplitude to the unknown frequency of the input signal and thereby permits rapid, direct, and accurate determination of the frequency of the input waveform. The apparatus A may be used for time series analysis of any type of electrical input signal by frequency to amplitude conversion, and is adapted for use in voice compression systems, particularly detecting the formant frequency of speech.

The apparatus A (FIG. 1) includes a control circuit E which responds to signal level transitions, such as for example, zero-axis crossings of a complex input signal waveform of unknown frequency and controls an eight-bit binary counter B, permitting the counter B to count the clock pulses generated by a high speed clock C. An eight-bit storage register S stores the output count of the binary counter B and presents the stored output count to a digital to analog converter D. The converter D produces an output signal corresponding in amplitude to the output count of the binary counter B, thus providing an output signal whose amplitude indicates the duration between signal level transitions, and consequently the frequency, of the input signal. A limiting circuit L controls the binary counter B in response to a predetermined output count from the binary counter B and provides a frequency limit for conversion of the input frequency into a corresponding output amplitude by the apparatus A.

Figure 2:
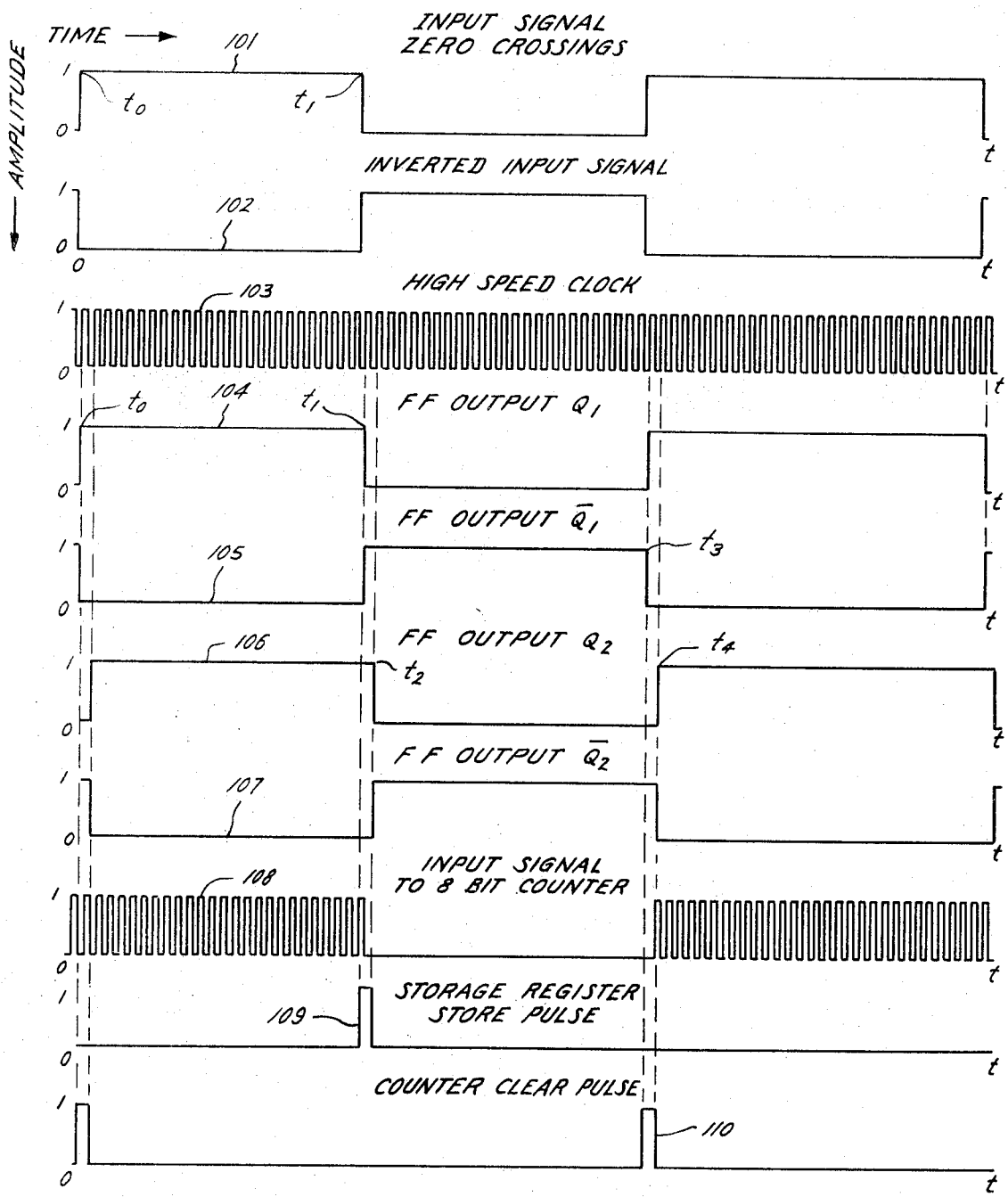
FIG. 2 is a waveform diagram of voltage waveforms occurring in the converters of the present invention.

The control circuit E (FIG. 1) includes an input conductor 10 which is electrically connected at an input terminal 10a to a zero crossing detector of the conventional well-known type. The zero crossing detector produces an output square wave of a predetermined amplitude which varies in frequency in accordance with the zero axis crossings of the complex input signal waveform, as is known. An Input Signal Zero Crossing Waveform 101 (FIG. 2) illustrates the voltage waveform output of the zero crossing detector appearing on the signal input conductor 10 (FIG. 1). The signal input conductor 10 is electrically connected to a J input 12a of a J–K flip-flop 12 of the control circuit E. An electrical conductor 10b applies the input signal on the input conductor 10 to an inverter 11 which inverts the Input Signal Zero Crossing Waveform 101, forming the Inverted Input Signal 102 waveform (FIG. 2). The Inverted Input Signal 102 is furnished over an electrical conductor 11a to a K-input 12b of the J–K flip-flop 12.

A $Q_1$ output terminal 12c of the flip-flop 12 provides an output signal of corresponding polarity to the input signal applied at the J-input terminal 12a. When the flip-flop 12 is energized by a clock pulse from the clock C at a clock pulse input terminal 12f, the flip-flop 12 transfers the input signal 101 from the input terminal 12a to the output terminal 12c. The output terminal 12c remains at the level of the transferred signal during the interval until the next clock pulse, and provides a voltage waveform 104 (FIG. 2) over an electrical conductor 12e to a J-input terminal 13a of a second J–K flip-flop 13 (FIG. 1). When the input signal 101 changes to a logic "1" level at a time $t_0$ in response to an axis crossing of the input signal, the flip-flop 12 transfers the signal 101 to the output terminal 12c, providing the waveform 104.

A $\bar{Q}_1$ output terminal 12g of the flip-flop 12 provides an output signal corresponding to the input signal appearing at the K-input terminal 12b of the flip-flop 12. The input signal is transferred from the terminal 12b to the terminal 12g when the flip-flop 12 is energized by a clock pulse appearing at the clock pulse input terminal 12f. The output terminal 12g maintains the level of the transferred signal until receipt of the next clock pulse and provides a voltage waveform 105 (FIG. 2) which is furnished by an electrical conductor 12e to a K-input terminal 13b of the second J–K flip-flop 13.

A $Q_2$ output terminal 13c of the second J–K flip-flop 13 provides an output signal corresponding to the input signal appearing at the J-input terminal 13a of the flip-flop 13. The input signal is transferred when the flip-flop 13 is energized by a clock pulse at a clock pulse input terminal 13f, providing a voltage waveform 106 appearing at the $Q_2$ output terminal 13c. A $\bar{Q}_2$ output terminal 13g provides an output signal waveform 107 (FIG. 2) of like polarity to the input signal appearing at the K-input terminal 13b of the flip-flop 13. The input signal is transferred when the flip-flop 13 is energized by a clock pulse at the clock pulse input terminal 13f.

The high speed clock or oscillator C (FIG. 1) produces a square wave voltage output waveform 103 (FIG. 2) over an electrical conductor 20 to an electrical conductor 14 (FIG. 1) which is electrically connected by a plurality of conductors 14a and 14b to the clock pulse input terminals 12f and 13f of the flip-flops 12 and 13 respectively, to ensure synchronized operation of the clock C and the flip-flops 12 and 13. The electrical conductor 20 is also electrically connected to a first input 15a of a three-input NAND-gate 15 of the control circuit E. The NAND-gate 15, when energized in a manner to be set forth hereinbelow, permits the clock pulses from the high speed clock C to drive the eight-bit binary counter B. The output count of the counter B represents the number of clock pulses produced by the high speed clock C while the NAND-gate 15 of the control circuit E permits such pulses to pass during the time interval from the time $t_0$ to a time $t_1$ (FIG. 2) when the zero crossing detector changes state in response to a second axis-crossing of the complex input signal waveform.

A second input terminal 15b of the gate 15 is electrically connected by a conductor 14c to the conductor 12d and receives over such conductors the voltage waveform 104 (FIG. 2) present at the $Q_1$ output terminal 12c. A third input terminal 15c of the gate 15 receives an output signal from the limit circuit L (FIG. 1) over an electrical conductor 14d. The electrical signal over the conductor 14d is normally a logical "1," and consequently when the $Q_1$ terminal 12c of the flip-flop 12 is a logical "1," an output output terminal 15d of the gate 15 provides a voltage waveform 108 (FIG. 2) of opposite polarity or logic level to the voltage waveform 103 appearing over the conductor 20 at the input terminal 15a. The voltage waveform 108 appearing at the output 15d of the gate 15 is furnished over an electrical conductor 15e to an input terminal 30 of the eight-bit binary counter B.

The eight-bit binary counter B receives the input signal 108 at the terminal 30 and accumulates a binary output count of the number of such pulses. The individual bits of the binary output count are presented, at a plurality of output conductors 31, including a plurality of conductors 31a through 31h, inclusive, indicating the number of clock pulses produced by the clock C while the apparatus A is enabled. The conductor 31h bears the output signal representing the most significant bit of the output count from the binary counter B, and the conductors 31g through 31a, respectively, bear signals representing bits of lesser significance, as is evident from FIG. 1. The binary counter B counts the pulses in the waveform 108 appearing at the input terminal 30 until the flip-flop 12 of the enabling circuit E changes state at a time $t_1$ in response to a change of state in the input signal zero crossing waveform 101. The logical "0" output at terminal 12c disables the enabling circuit E by providing a logical "0" signal to the input terminal 15b of the gate 15, preventing the passage of subsequent clock pulses through the gate 15.

The limiting circuitry L senses the output count of the binary counter B present on the conductors 31 by a plurality of input conductors 41 each of which is individually connected to one of the output conductors 31. The limit circuit provides a logical "0," in a manner to be set forth hereinbelow, when a predetermined output count of the binary counter B, corresponding to the passage of a predetermined length of time between zero crossings of the input signal, is reached. This length of time is a predetermined maximum period, and thus a minimum frequency limit, of the input signal being analyzed.

An eight-input NAND-gate 49 is electrically connected to each of the eight conductors 41a through 41h respectively at a corresponding one of its eight input terminals. When the output count of the binary counter B reaches decimal 255, or binary 11111111, terminal 49a of the NAND-gate 49 is driven to a logical "0" prior to a change of state of the first flip-flop 12. The logical "1" present on each of the input conductors 41a through 41h will cause the output signal appearing at an output terminal 49a of the NAND-gate 49 to become a logical "0." This logical "0" is conveyed by the conductor 14d to the input terminal 15c of the gate 15, driving the output terminal 15d of the gate 15 to a logical "1," disabling the binary counter B. Subsequent clock pulses from the clock C thus do not pass through the gate 15, and the output count from the counter B remains at the predetermined output count.

The lower frequency limit for conversion of the input frequency into an output amplitude may be established at other suitable predetermined frequencies by adjusting the frequency of the high speed clock C, or by adjusting the predetermined output count of the binary counter B to a predetermined number by the inclusion of inverters in preselected ones of the electrical conductors 41a through 41h to adjust the predetermined count to drive terminal 49a of the limiting circuitry L to a logical "0." The output count of the binary counter B may also be adjusted to a predetermined count by selectively increasing or decreasing the capacity of the binary counter B above or below eight bits.

For example, should it be desired to reduce the lower frequency limit for conversion of the input frequency into an output amplitude by one-half, the frequency of the high speed clock C could be reduced by one-half, the capacity of the binary counter B could be reduced from eight bits to seven bits, or an inverter of like construction and function to the inverter 11 could be electrically connected with the conductor 41h between the electrical conductor 31b and the input terminal 48a of the NAND-gate 49. The lower limit frequency may thus be adjusted to provide a desired lower frequency limit for conversion of the input signal frequency into an output amplitude.

The storage circuit S includes a storage register 51 of like bit capacity to the binary counter B. The storage register 51 includes a plurality of flip-flops or other suitable binary memory devices for storing the output count of the binary counter B when energized by a storage register store pulse waveform 109 (FIG. 2) which is formed in a manner to be more evident hereinbelow. The storage register S receives the output count from the counter B and presents the output count to the converter D over a plurality of output conductors 61. A plurality of inverters 51a through 51h, respectively, are individually connected between the output conductors 31a through 31h respectively, and the corresponding inputs to the individual binary memory devices in the storage register 50. The inverters 51 invert the logic level of the output count from the binary counter B and convert a high binary count, caused by a long duration or low frequency input signal, to appear at the inputs to the storage register 50 as a small output count. In a like manner, a low binary output count of the binary counter B formed during a sort duration or high frequency input signal will be inverted by the inverters 51 respectively and appear at the input to the storage register 50 as a high output count. Thus, the inverters 51a through 51h cause the magnitude of the binary output count furnished by the storage circuit S on the output electrical conductors 61 to be in a direct relation to the frequency of axis crossings of the input signal.

The digital to analog converter D is responsive to the binary output count present on the conductors 61 and converts such binary count into an output analog signal corresponding in amplitude to the output count stored in the storage register 50, producing an output signal whose amplitude indicates the duration between axis crossings of the input signal waveform 101 furnished over the conductor 10 from the zero crossing detector. Any digital to analog converter of the well-known type which converts an input binary signal into an output analog signal may be used as the converter D in the apparatus A.

An output conductor 71 is connected to the output terminal of the digital to analog converter D and provides the output signal whose amplitude corresponds to the input signal frequency to a signal output terminal 71a. A low pass filter of the well-known type may be connected to the output terminal 71a, and the impedances of the circuit elements of such filter are chosen so that the frequency of the input signal is within the pass band of the filter. When the low pass filter is connected to the output terminal 71a, the output signal from the low pass filter is a slowly varying signal whose magnitude is the fundamental frequency of the input signal waveform. When the input signal is a speech signal, the output of the low pass filter is a signal whose magnitude indicates the formant frequency of the input speech.

A NAND-gate 16 is connected at a first input terminal 16a by an electrical conductor 16c to the electrical conductor 12h to receive the voltage waveform 105 (FIG. 2). A second input terminal 16b of the NAND-gate 16 is electrically connected by a conductor 16d to the $Q_2$ output 13c of the flip-flop 13 to receive the voltage waveform 106.

For the duration of one cycle of the output waveform 103 of the clock C between the time $t_1$ when the flip-flop 12 changes state until a time $t_2$ when the flip-flop 13 changes state in response to such input signal, the output signal at an output terminal 16e of the NAND-gate 16 is a logical "0" due to a logical "1" at both input terminals 16a and 16b. The logical "0" is inverted by an inverter 16g, producing the storage register store pulse 109 (FIG. 2) which is fed by an electrical conductor 16h to a read-in or strobe input 50a of the storage register 50. The storage register store pulse 109 energizes the memory devices in the storage register 50 and initiates transfer of the output count of the counter B present on the conductors 31 into the storage register 50. The storage register 50 presents the stored output count over the conductors 61 to the digital to analog converter D for conversion of the output count into an output signal signal whose amplitude indicates the duration between axis crossings of the input signal.

A counter clear NAND-gate 17 (FIG. 1) is electrically connected at a first input terminal 17a to the $Q_1$ output terminal 12c of the flip-flop 12 by an electrical conductor 17b and receives voltage waveform 104 (FIG. 2). A second input terminal 17c of the NAND-gate 17 is connected by a conductor 17d to the $\bar{Q}_2$ output 13g of the flip-flop 13 and receives the voltage waveform 107 (FIG. 2). For the duration of one cycle of the high speed clock C between a time $t_3$ (FIG. 2) when the flip-flop 12 changes state in response to a change in the input signal waveform 101 until a time $t_4$ when the flip-flop 13 changes state in response to the change of state of the flip-flop 12, an output terminal 17e (FIG. 1) is driven to a logical "0" by logical "1" present at both input terminals 17b and 17c. The logical "0" signal is conducted by a conductor 17f to an inverter 17g, which converts the logical "0" into a logical "1," forming the counter clear pulse waveform 110 (FIG. 2) which is furnished over an electrical conductor 17h to a counter clear input terminal 39 of the binary counter B. When the binary counter B receives the counter clear waveform 110 at the input terminal 39, the binary counter B is reset to a decimal 0 or a binary "00000000." The output count of the binary counter B is reset and the counter D is prepared for a new cycle of counting at the proper initial count.

In the operation of the present invention, the apparatus A receives the input signal waveform 101 from the zero crossing detector over the input conductor 10. When the input signal changes from a logical "0" to a logical "1" at the time $t_1$, the flip-flop 12 changes state at the next clock pulse thereafter, causing the $Q_1$ output terminal 12c to indicate a logical "1." At this time, the counter clear pulse 110 is formed by the counter clear NAND-gate 17 and resets the binary counter B to a binary zero, or "00000000."

The output of the NAND-gate 49 is a logical "1," and the NAND-gate 15 is thus receiving logical "1" on each of the input terminals 15b and 15c. The input to the terminal 15a is the high speed clock pulse waveform 103 on the conductor 20 and the logical "0" of such high speed clock pulses at the output terminal 15d of the gate 15 becomes the logical "1" of the input signal waveform 108 fed to the binary counter B. The binary counter B counts the number of pulses in the input signal waveform 108 until the NAND-gate 15 blocks further passage of such clock pulses at the time $t_1$.

When the input signal waveform 101 changes to a logical "0" at a time $t_1$ in response to a second axis crossing of the input signal prior to the binary counter B reaching the predetermined maximum count, the storage register store pulse 109 is furnished to the strobe input 50a of the storage register by the NAND-gate 16 and associated circuitry, causing the storage register 50 to receive the binary output count from the counter B. The output count represents the number of clock pulses occuring between the zero crossings and thus the duration between zero crossings of the input signal sensed by the zero crossing detector and furnished to the apparatus A as waveform 101. The change in the input signal waveform to a logical "0" at time $t_1$ also causes the $Q_1$ terminal 12c to become a logical "0." The logical "0" output signal is furnished to the input terminal 15b of NAND-gate 15, preventing subsequent clock pulses from the clock C from driving the binary counter B.

The binary output count is inverted in inverters 51 during transfer to storage register 50, causing the storage register 50 to present a binary count corresponding to the inverse of the duration between input signal zero crossings, or the frequency of the input signal. The converter D receives the input binary count over the conductors 61 and produces an output signal whose amplitude corresponds to the binary count. The output signal appearing over the output conductor 71 is furnished to the low pass filter whose output is a slowly varying direct current signal whose magnitude is proportional to the fundamental frequency of the complex input signal waveform.

A subsequent zero crossing of the complex input signal causes the zero crossing detector to change the logical level of the input signal waveform 101 at the time $t_3$, causing the counter clear NAND gate to form the counter clear pulse waveform 110, in a manner previously set forth. The counter clear pulse waveform 110 resets the binary counter B for a subsequent cycle of counting in response to such logic level change in the flip-flop 12.

When the fundamental frequency of the complex input signal waveform is lower than the predetermined lower frequency limit maintained by the limiting circuitry L, the binary counter B reaches the predetermined maximum count corresponding to the predetermined lower frequency, as has been previously set forth, prior to the time $t_1$ when the storage register store pulse 109 is formed by the NAND-gate 16 and associated circuitry. The output terminal 49a of limiting NAND-gate 49 is driven to a logical "0," which is furnished by the conductor 14d to the input 15c of the NAND-gate 15, causing the output terminal 15d to become a logical "1," preventing clock pulses in the high speed clock waveform 103 from driving the binary counter B past the predetermined count. The binary counter B thus remains at the predetermined maximum count until the subsequent occurrence at the time $t_1$ of the input signal zero crossing. At the time $t_1$, the NAND-gate 16 and associated circuitry from the storage register store pulse 109 transferring the predetermined maximum binary count, which has been maintained by the binary counter B in the manner previously set forth, into the storage register 50 after being inverted in the inverters 51. When the fundamental frequency of the complex signal waveform is lower than the predetermined lower frequency limit, the inverted maximum count is stored in the storage register 50 and converted into the output amplitude of the converter D. Thus, the amplitude of the signal furnished to the low pass filter over the output conductor 71 does not decrease in amplitude below an amplitude corresponding to the lower frequency limit established by the limiting circuitry L, providing a lower frequency limit for conversion of the input frequency into an output amplitude.

Figure 3:
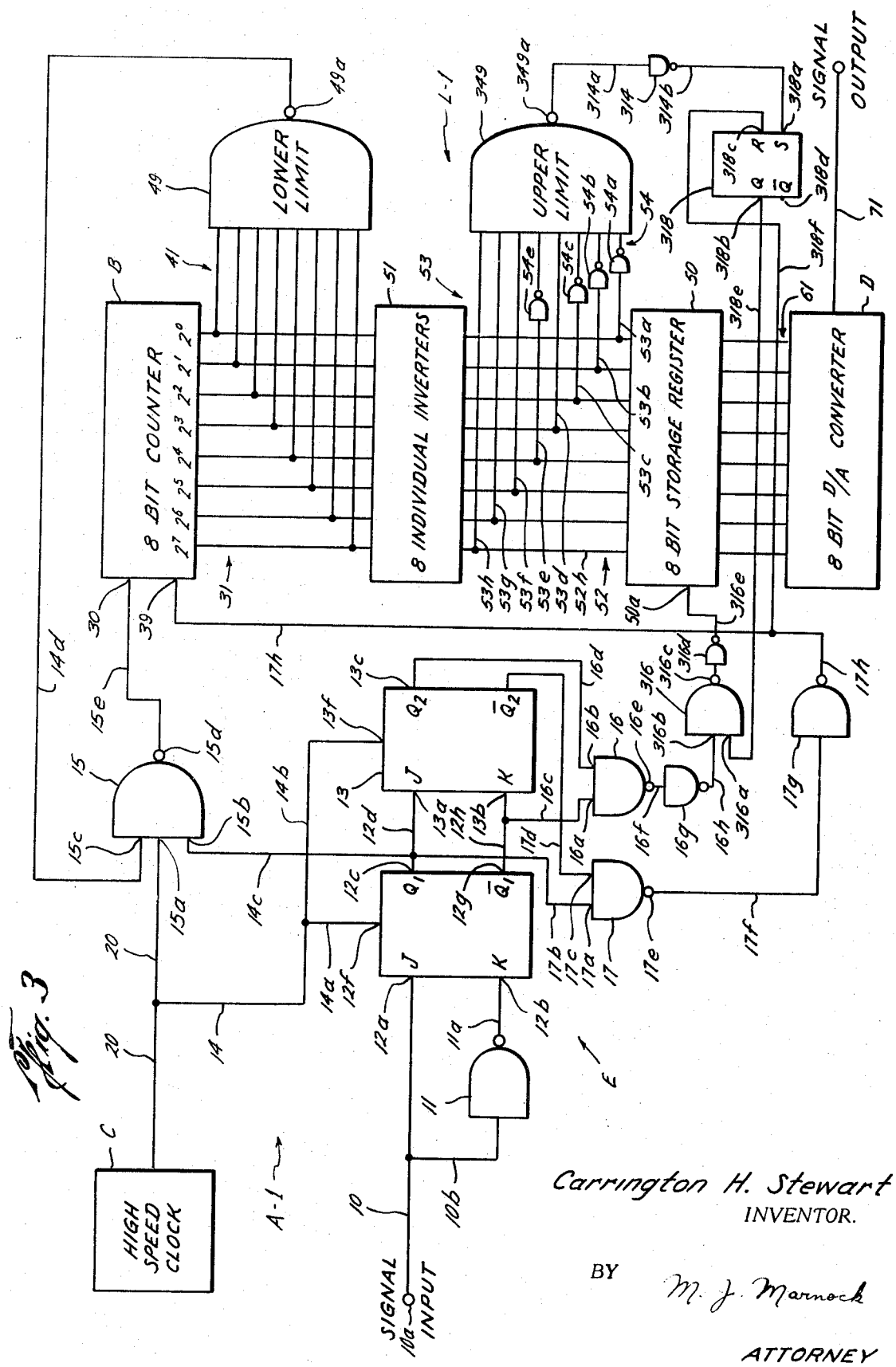
FIG. 3 is a schematic electrical circuit diagram of an alternative frequency to amplitude converter of the family of frequency to amplitude converters of the present invention.

An alternative apparatus A-1 (FIG. 3) of the family of frequency to amplitude converters of the present invention converts a complex input signal eaveform of an unknown frequency into an output signal corresponding in amplitude to the unknown frequency of such input signal in a like manner to the apparatus A (FIG. 1) and provides a lower limit and an upper limit frequency for conversion of the input frequency into an output amplitude, as will be more evident hereinbelow.

In the conversion apparatus A-1, like circuit components and electrical conductors which perform a like function to the circuit components and conductors of the apparatus A (FIG. 1) bear like reference numerals.

A limiting circuit L-1 in the apparatus A-1 controls the binary counter B in response to a predetermined output count from the binary counter B, providing a lower frequency limit and an upper frequency limit for conversion of the input signal waveform frequency into an output amplitude.

The input circuit L-1 includes an eight-input lower limit NAND-gate 49 electrically connected by the input conductors 41 to the output conductors 31 of the binary counter B. When the predetermined maximum binary count of "11111111" is reached by the binary counter B prior to a second zero crossing in the input waveform 101, the lower limit NAND-gate 49 disables the NAND-gate 15 by means of a logical "0" output signal conveyed to the NAND-gate 15 by the conductor 14d, in a like manner to the like numbered NAND-gate 49 in the apparatus A (FIG. 1).

An eight-input limit NAND-gate 349 is included in the limit circuit L-1 of the apparatus A-1 (FIG. 3) in order to provide an upper frequency limit for conversion of the input frequency into an output amplitude by the apparatus A-1.

A plurality of input conductors 53, including the input conductors 53a through 53a, respectively, individually connect each of the eight input terminals of the upper limit NAND-gate 349 to a corresponding one of the output conductors 52 connecting the inverters 51 to the eight-bit storage register 50. For example, the input conductor 53h electrically connects the output conductor 52h to one of the eight input terminals of the NAND-gate 349. An output terminal 349a of the NAND-gate 349 is at a logical "1" state unless the input at each of the eight input terminals to the NAND-gate 349 is a logical "1," driving the output terminal to a "0" state.

An inverter 314 is electrically connected by a conductor 314a to the output terminal 349a, inverting the output of the NAND-gate 349 and furnishing such inverted output over a conductor 314b to a SET input 318a of an R-S flip-flop or bistable 318. When a logical "1" is applied to the input terminal 318a of the flip-flop 318, a Q-output terminal 318b is driven to a logical "1" state and a $\bar{Q}$-output terminal 318d is driven to a logical "0," and remains in such state until a logical "1" is applied to a RESET input terminal 318c of the flip-flop 318. When the Q-output terminal 318b is in a logical "1" state, application of subsequent logical "1" signals to the input terminal 318a does not change the state of terminals 318b and 318d.

Application of a logical "1" input signal to the RESET input 318c of the flip-flop 318 drives the $\bar{Q}$-output terminal 318d to a logical "1" state while simultaneously driving the Q-output terminal 318b to a logical "0" state. An electrical conductor 318e connects the Q-output 318b of the flip-flop 318 to a first input 316a of a two-input NAND-gate 316. A second input 316b of the NAND-gate 316 is electrically connected to the inverter 16g by the conductor 16h and receives over such conductor, waveform 109 (FIG. 2) formed during the cycle of the clock pulse waveform 103 between the times $t_1$ and $t_2$ as has been set forth hereinabove. An output terminal 316c of the NAND-gate 316 remains at a logical "1" until the input terminals 316a and 316b of the gate 316 are both logical "1" at which time the output terminal 316c is driven to a logical "0." The output signal of the output terminal 316c is inverted in an inverter 316d and conveyed by an electrical conductor 316e to the strobe or read in input 50a of the storage register 50.

An electrical conductor 318f connects the conductor 17h to the RESET input 318c of the flip-flop 318 furnishing the counter clear pulse waveform 110 (FIG. 2) to such input terminal, driving the $\bar{Q}$-output terminal 318d of the flip-flop 318 to a logical "1" and the output terminal 318b to a logical "0."

A plurality of coding inverters 54, including a coding inverter 54a electrically connected between the conductor 53a and a first input terminal of the NAND-gate 349, a coding inverter 54b electrically connected between the conductor 53b and a second input of the NAND-gate 349, a coding inverter 54c electrically connected between the conductor 53c and the gate 349, and a coding inverter 54e electrically connected between the conductor 53e and gate 349 are connected in the conductors 53 to establish an upper limit frequency for conversion of the input frequency into an output amplitude, in a manner to be more evident hereinbelow.

The coding inverters 54 are connected in preselected ones of the input conductors 53 of the upper limit NAND-gate 349 to drive the output signal from the output terminal 349a to a logical "0" when a predetermined minimum count, corresponding to a predetermined minimum time duration between a first and second axis crossings of the input signal waveform occurs. The predetermined minimum time duration will correspond to a predetermined maximum or upper limit frequency, as will be more evident hereinbelow.

When the output terminal 349a is driven to a logical "0" upon occurrence of the predetermined minimum count in the binary counter B, in this embodiment a decimal 23, or logical "00010111," the upper limit NAND-gate 349 receives an input signal "11111111" at its inputs, and the output terminal 349a becomes a logical "0" as is evident from the drawings. The logical "0" at output terminal 349a is inverted by the inverter 314 and applied to the SET input 318a to drive the Q-output 318b of the flip-flop 318 to a logical "1."

When the zero crossing detector senses a zero crossing in the complex input signal waveform at the time $t_0$ (FIG. 2), the counter clear NAND-gate 17 forms the counter clear pulse 110 over the conductor 17a to the counter clear input terminal 39 of the binary counter B clearing such counter. The counter clear pulse 110 is also conducted by the conductor 318f to the RESET input 318c of the flip-flop 318, driving the $\bar{Q}$-output 318d to a logical "1" and the Q-output 318d to a logical "0." The NAND-gate 15 receives the input waveform 104 from the conductor 14c at its input terminal 15b enabling the gate 15 to pass the clock pulse waveform 103 to the input terminal 30 of the binary counter B. The counter B counts the clock pulses occurring between the time $t_0$ and the time $t_1$ of the second axis crossing of the input signal.

The lower limit NAND-gate 49 operates in a like manner to the like numbered NAND gate in the limit circuit L of the apparatus A (FIG. 1) disabling the NAND-gate 15 when the binary counter B reaches the predetermined maximum count establishing the predetermined lower limit frequency as has previously been set forth.

When the time duration between the time $t_0$ of the first axis crossing of the input signal and the time $t_1$ of the second axis crossing of the input signal is less than the predetermined maximum, corresponding to the lower frequency limit, and greater than the predetermined minimum, corresponding to the upper frequency limit, the binary counter B counts to the predetermined coded output count which causes the coding inverters 54 to present an input signal of "11111111" to NAND-gate 349. The output terminal 349a of the upper limit NAND-gate 349 is driven to a logical "0" which is inverted to energize the SET terminal 318a of the flip-flop 318, driving the Q-terminal 318b to a logical "1."

The binary counter B does not stop counting upon reaching the predetermined minimum count, and continues counting until the time $t_1$ of the second axis crossing of the input signal wave form 101. At this time, the NAND-gate 16 and inverter 16g form the storage register store pulse waveform 109 (FIG. 2), which is furnished over the conductor 16h to the input terminal 316b of the NAND-gate 316.

The binary counter B exceeds the predetermined minimum count, as has been previously set forth, and the logical "1" at the Q-output terminal 318b of the flip-flop 318 formed at the time binary counter B reaches such predetermined minimum count, in the manner previously set forth, appears at the input terminal 316a of the NAND-gate 316. Simultaneous presence of the logical "1" at both input terminals 316a and 316b of the NAND-gate 316 drives the output terminal 316c to a logical "0," which is inverted to a logical "1" and conveyed by the conductor 316e to the strobe or read-in input terminal 50a of the storage register 50, initiating transfer of the output count of the binary counter B. The output count of the binary B at this time is the number of high speed clock pulses 103 which have occurred during the time interval between the time $t_0$ of the first axis crossing of the input signal wave form and the time $t_1$ of the second axis crossing, as is shown by waveform 108 (FIG. 2).

When the frequency of the input signal waveform is greater than the predetermined upper limit frequency, the duration of the time interval between the time $t_0$ of the first axis crossing of the input signal waveform and the time $t_1$ of the second axis crossing of the input signal waveform is shorter than the length of time for the binary counter B to count to the predetermined minimum count. Thus, the output terminal 349a is not driven to a logical "0" through the coding inverters 54. Consequently, the Q-output terminal 318b of the flip-flop 318 is in a logical "0" state at the time the storage register store pulse waveform 109 is formed by the NAND-gate 16 and inverter 16g. The logical "0" at the output terminal 318b is furnished to the input terminal 316a of the NAND-gate 316 by the conductor 318e. The presence of the logical "0" at the input terminal 316a of the NAND-gate 316 prevents the storage register store pulse waveform 109 (FIG. 2) present at the input terminal 316b from driving the output terminal 316c to a logical "0," and maintains the output terminal 316c at a logical "1." The continuing logical "1" at the terminal 316c is inverted by the inverter 316d to a logical "0," preventing the input terminal 50a of the storage register 50 from receiving the storage register store pulse. The storage register 50 does not receive a count below the predetermined minimum count, thus providing an upper frequency limit for conversion of the input frequency into an output amplitude.

It should be understood that the particular arrangement of the coding inverters 54 and the input conductors to the upper limit NAND-gate 349 may be selectively varied to achieve a predetermined minimum count corresponding to the desired predetermined upper frequency limit for conversion of the input frequency.

Figure 4:
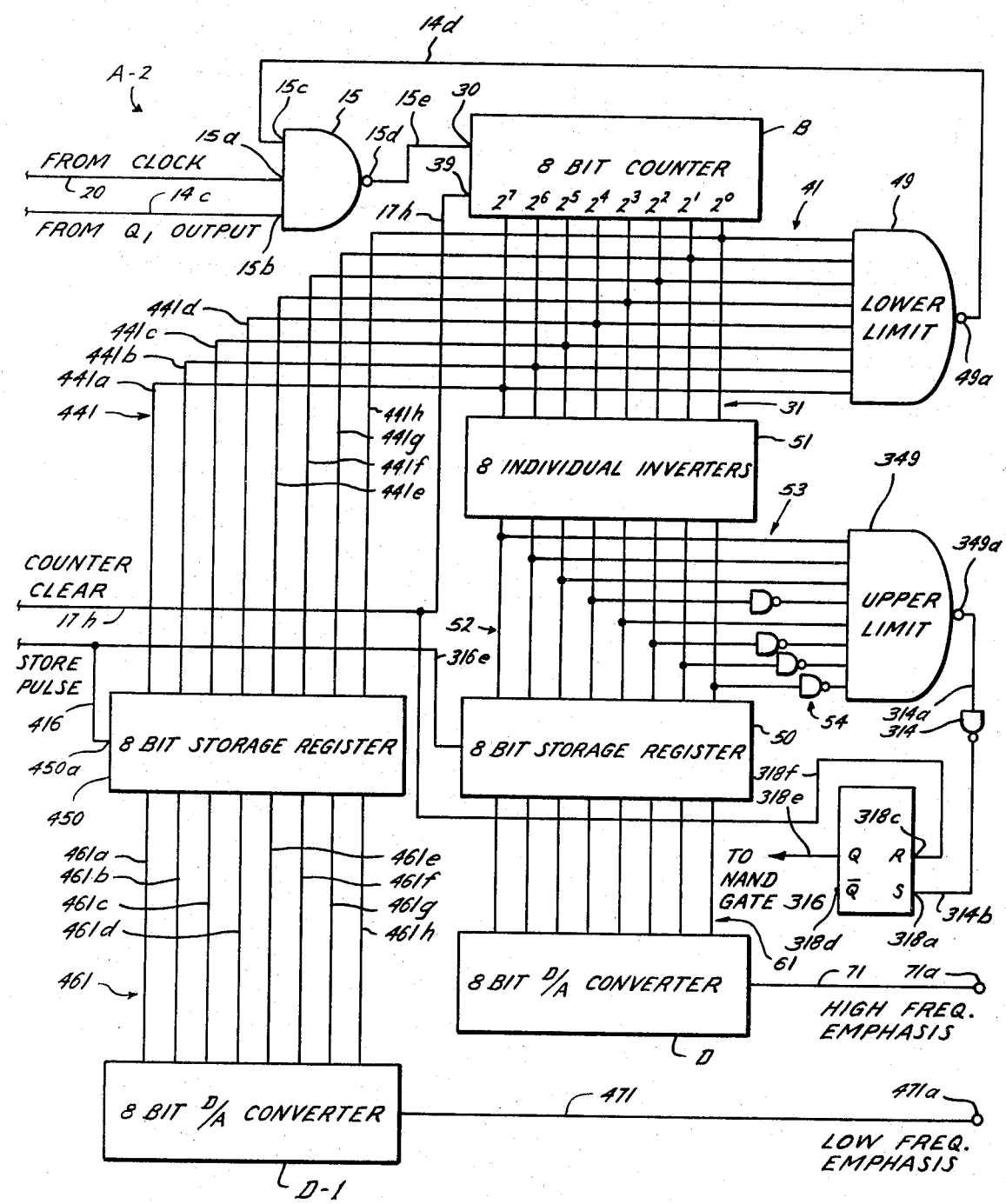
FIG. 4 is a schematic electrical circuit diagram of an alternative frequency to amplitude converter of the family of frequency to amplitude converters of the present invention.

An apparatus A-2 (FIG. 4) of the family of frequency to amplitude converters of the present invention provides a plurality of output signals varying in amplitude in accordance with the presence of upper frequency or lower frequency components of the input frequency, for analysis and like purposes. In the apparatus A-2, circuit components and electrical conductors performing a like function to circuit components and conductors of the apparatus A and A-1 bear like reference numerals.

A plurality of electrical conductors 441, including an input conductor 441a through 441h, respectively are individually electrically connected to individual ones of the output conductors 31 of the binary counter B and convey the output count of the binary counter B to a second eight-bit storage register 450, of like construction and operation to the first eight-bit storage register 50. An electrical conductor 416 electrically connects the conductor 316e to a read-in input terminal 450a of the storage register 450 and conveys the storage register store pulse waveform 109 to such storage register 450, initiating transfer of the output count from the binary counter B to the storage register 450. The storage register store pulse waveform 109 is formed in the apparatus A-2 in a like manner to the storage register store pulse formed in the apparatus A-1 (FIG. 3) previously set forth hereinabove, and is conveyed to the storage registers 50 and 450 over the conductors 316e and 416.

A plurality of output conductors 461, including an output conductor 461a through 461h, respectively, individually electrically connect the output terminals of the eight-bit storage register 450 to the input terminals of a second eight-bit digital to analog converter D-1, of like structure and operation to the first eight-bit digital to analog converter D. The converter D-1 senses the stored output count presented to the converter D-1 by the storage register 450 and converts such binary count into an analog signal whose amplitude corresponds to the binary count. An output conductor 471 conducts the output amplitude signal to an output terminal 471a. A low pass filter may be electrically connected to the output terminal 471a in order to provide a slowly varying direct current signal whose magnitude varies in accordance with the presence of a low frequency input signal into the apparatus A-2.

In the operation of the apparatus A-2, the flip-flop 12 enables the enabling NAND-gate 15 with the waveform 104 over the conductor 14c in response to a first axis crossing of the input signal waveform, permitting the high speed clock C to furnish the clock pulse waveform 103 to the binary counter B to be counted by the counter B.

The upper limit NAND-gate 349 and the lower limit NAND-gate 49 operate in a like manner to the like numbered circuitry in the apparatus A-1, previously set forth hereinabove, and control the binary counter B in response to predetermined maximum and minimum output counts, respectively, from the binary counter B.

When the store pulse waveform 109 is formed in the NAND-gate 316, in a like manner to the formation of such waveform in the apparatus A-1 previously set forth hereinabove, the output count of the binary counter B is transferred from the conductors 31 over the conductors 441 to the second eight-bit storage register 450, while simultaneously being inverted in the inverters 51 and furnished by the conductors 52 to the eight-bit storage register 50.

The storage register 450 presents the stored output count of the binary counter B to the second eight-bit converter D-1 over the conductors 461, while the storage register 50 presents the inverted stored output count of the binary counter B to the first digital to analog converter D over the conductor 61.

The converters D and D-1 transform the binary count presented thereto into output signals whose amplitude vary in accordance with the input frequency furnished the apparatus A-2 by the zero crossing detector.

When the frequency of the complex input signal waveform is a low frequency, the output count of the binary counter B will be a relatively high count, as has been set forth hereinabove, and the binary count stored in the second storage register 450 will be relatively large, while the inverted binary output count stored in the first storage register 50 will be relatively low. The amplitude of the output signal from the second converter D-1 will be large, and the output of the first converter D will be small. The output signal amplitude of the output terminal 471a will thus be larger than the output signal amplitude of the output terminal 71a, indicating the presence of a low frequency of the complex input signal waveform, and the magnitude of the signal at the terminal 471a indicates the frequency of such input signal waveform.

When the frequency of the complex input signal waveform is relatively high, the output count of the binary count B will be relatively low, as has been set forth hereinabove, causing the inverted output count stored in the first storage register 50 to be relatively high, while the output count stored in the register 450 is relatively low. The output signal amplitude of the converter D present on the output terminal 71a will be large with respect to the output signal amplitude of the converter D-1 present on the output terminal 471a, indicating a relatively high frequency of the complex signal waveform, with the magnitude of the signal present on the terminal 71a indicating the frequency of the input signal waveform for testing and analysis purposes.

The foregoing disclosure and description of the invention are illustrative and explanatory thereof, and various changes in the size, shape, materials, wiring connections and contacts as well as in the details of the illustrated circuitry and construction may be made without departing from the spirit of the invention.

I claim:

1. An apparatus for conversion of the frequency of an input signal into the amplitude of an output signal for analysis and like purposes, comprising:
   a. means for providing a series of clock pulses;
   b. means responsive to signal level transitions of the input signal for controlling the conversion apparatus;

c. counting means responsive to said controlling means for providing an output count of the clock pulses produced by said clock means;

d. converter means responsive to said counting means for producing an output signal amplitude responsive to the output count of said counting means, wherein the output signal amplitude indicates the duration between level transitions of the input signal; and e. limit means for establishing a predetermined limit frequency for operation of the conversion apparatus.

2. The structure of claim 1, wherein said limit means comprises:

lower limit means for disabling said counting means in response to a predetermined output count from said counting means providing a lower frequency limit for conversion of the input frequency into an output amplitude.

3. The structure of claim 1, wherein said limit means comprises:

upper limit means for preventing an output count lower than a predetermined minimum output count thereby providing an upper frequency limit for conversion of the input frequency into an output amplitude.

4. The structure of claim 1, further including:

storage means for storing the output count of said counting means, said storage means presenting the stored output count to said converter means.

5. The structure of claim 5, wherein said controlling means comprises:

means for initiating transfer of the output count from said counting means to said storage means.

6. The structure of claim 1, wherein said controlling means comprises:

logic means responsive to a first signal level transition of the input signal for permitting clock pulses from said clock to drive said counting means, said logic means being further responsive to a second signal level transition of the input signal, preventing subsequent clock pulses from driving said counting means.

7. The structure of claim 1, wherein said controlling means comprises:

counter clear means for resetting said counting means to a predetermined initial count in response to a level transition of the input signal, thereby causing said counting means to begin counting at the proper initial count.

8. The structure of claim 1, wherein said converter means comprises:

a. first converter means responsive to said counting means for producing an output signal amplitude indicating a low frequency input signal; and b. second converter means responsive to said counting means for producing an output signal amplitude indicating a high input signal, wherein a plurality of output signals varying in amplitude in accordance with the input frequencies are available for analysis and like purposes.

9. The structure of claim 8, further including storage means, said storage means comprising:

a. first storage means for storing the output count of said counting means, said first storage means presenting the stored output count to said first converter means for conversion; and b. second storage means for storing the output count of said counting means, said second storage means presenting the stored output count to said second converter means for conversion.

10. The structure of claim 1, wherein said controlling means comprises:

means responsive to zero-axis crossings of the input signal for controlling the conversion apparatus.

* * * * *